US012793627B2

(12) United States Patent
Son et al.

(10) Patent No.: US 12,793,627 B2
(45) Date of Patent: Nov. 10, 2026

(54) PIXEL, DISPLAY DEVICE, AND ELECTRONIC DEVICE

(71) Applicant: Samsung Display Co., Ltd., Yongin-si (KR)

(72) Inventors: Min Seong Son, Yongin-si (KR); Seung Kyu Lee, Yongin-si (KR); Min Jun Kim, Yongin-si (KR); Jae June Park, Yongin-si (KR); Jun Yi Choi, Yongin-si (KR); Jin Sung Choi, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/398,802

(22) Filed: Nov. 24, 2025

(65) Prior Publication Data

US 2026/0212807 A1 Jul. 23, 2026

(30) Foreign Application Priority Data

Jan. 22, 2025 (KR) ........................ 10-2025-0009597

(51) Int. Cl.
*G09G 3/32* (2016.01)

(52) U.S. Cl.
CPC ......... *G09G 3/32* (2013.01); *G09G 2300/043* (2013.01); *G09G 2300/0819* (2013.01); *G09G 2310/0267* (2013.01); *G09G 2310/08* (2013.01); *G09G 2320/0257* (2013.01)

(58) Field of Classification Search
None
See application file for complete search history.

(56) References Cited

U.S. PATENT DOCUMENTS

| | | | | |
|---|---|---|---|---|
| 10,004,124 | B1 * | 6/2018 | Ko | G09G 3/14 |
| 2014/0049169 | A1 * | 2/2014 | Li | G09G 3/3233 315/173 |
| 2025/0124865 | A1 * | 4/2025 | Yao | G09G 3/3233 |
| 2025/0174178 | A1 * | 5/2025 | Park | G09G 3/32 |
| 2025/0273159 | A1 * | 8/2025 | Bong | G09G 3/3266 |
| 2026/0018120 | A1 * | 1/2026 | Zhang | G09G 3/32 |
| 2026/0073854 | A1 * | 3/2026 | Guo | G09G 3/32 |

* cited by examiner

*Primary Examiner* — Matthew Yeung
(74) *Attorney, Agent, or Firm* — Womble Bond Dickinson (US) LLP

(57) ABSTRACT

A pixel includes a first transistor connected to a second node, and having a gate connected to a first node, a second transistor connected to a third node, and having a gate electrically connected to a first scan line, a third transistor between the first and second nodes, and having a gate electrically connected to a fifth scan line, a fourth transistor connected to the first node, and having a gate electrically connected to a third scan line, a fifth transistor connected to the third node, and having a gate electrically connected to a second scan line, a sixth transistor between the second and fourth nodes, and a light-emitting element, wherein the fifth scan line receives a fifth scan signal in a non-emission period in which the sixth transistor is turned off, and the second scan line receives a second scan signal after the fifth scan signal.

20 Claims, 9 Drawing Sheets

PIXEL, DISPLAY DEVICE, AND ELECTRONIC DEVICE

CROSS-REFERENCE TO RELATED APPLICATION

The present application claims priority to, and the benefit of, Korean Patent Application No. 10-2025-0009597 filed in the Korean Intellectual Property Office on Jan. 22, 2025, the entire disclosure of which is incorporated herein by reference.

BACKGROUND

1. Field

The present disclosure relates to a pixel, a display device, and an electronic device.

2. Description of the Related Art

A display device is increasing in importance with development of multimedia. Accordingly, use of the display device, such as an organic light-emitting displays (OLED), a liquid crystal displays (LCD), and the like, is increasing.

The display device includes a plurality of pixels. Each of the pixels includes a plurality of transistors, a light-emitting element electrically connected to the transistors, and a capacitor. The transistors generate a driving current based on signals provided through signal lines, and the light-emitting element emits light based on the driving current. However, leakage of the driving current inside the pixel may occur, and an afterimage or the like may be visually recognized in the image. As a result, display quality may decrease.

SUMMARY

Embodiments of the present disclosure provide a pixel, a display device, and an electronic device having improved display quality. For example, the display device may increase magnitude of an off-bias voltage applied to a driving transistor during an off-bias period, thereby reducing or preventing the likelihood of a phenomenon in which an afterimage is visually recognized in an image, and thereby improving display quality.

According to one or more embodiments of the present disclosure, a pixel includes a first transistor connected between a first driving power node for receiving a first power voltage and a second node, and having a gate electrode connected to a first node, a second transistor connected between a data line and a third node, and having a gate electrode electrically connected to a first scan line, a third transistor connected between the first node and the second node, and having a gate electrode electrically connected to a fifth scan line, a fourth transistor connected between an initialization power node for receiving an initialization power and the first node, and having a gate electrode electrically connected to a third scan line, a fifth transistor connected between a reference power node for receiving a reference power and the third node, and having a gate electrode electrically connected to a second scan line, a sixth transistor connected between the second node and a fourth node, and having a gate electrode electrically connected to a light emission control line, and a light-emitting element connected to the fourth node, wherein the fifth scan line is configured to receive at least one fifth scan signal in a non-emission period in which the sixth transistor is turned off, and wherein the second scan line is configured to receive at least one second scan signal after the at least one fifth scan signal is applied.

The third transistor may include a P-type transistor, wherein a voltage of the first node is configured to rise to a first voltage due to a first kickback phenomenon at a rising edge of the fifth scan signal.

The fifth transistor may include a P-type transistor, wherein a voltage of the first node is configured to rise from the first voltage to a second voltage due to a second kickback phenomenon at a rising edge of the second scan signal.

The second voltage may be configured to be applied to the first transistor during a bias period after the at least one second scan signal is applied to the second scan line.

The bias period may be equal to or greater than one horizontal period.

The pixel may further include a seventh transistor connected between the initialization power node and the fourth node, and having a gate electrode electrically connected to a fourth scan line, a second capacitor connected between the first node and the third node, and a first capacitor connected between the first driving power node and the third node.

In the non-emission period, the fifth scan signal may be configured to be applied during a first period, the second scan signal may be configured to be applied in a second period after the first period, and a first scan signal may be configured to be applied to the first scan line in a third period after the second period, wherein the bias period is between the second period and the third period.

In the non-emission period, the second scan signal and the fifth scan signal may be respectively applied in a fourth period and in a fifth period between the bias period and the third period.

During the first period, the third transistor may be configured to be turned on, and a voltage obtained by subtracting a threshold voltage of the first transistor from the first power voltage may be configured to be applied to a gate electrode of the first transistor.

During a sixth period after the second period, the fourth transistor may be configured to be turned on, and a voltage of the initialization power may be configured to be applied to the gate electrode of the first transistor.

According to one or more embodiments of the present disclosure, a display device includes pixels connected to scan lines, a light emission control line, and a data line, and a scan driver for driving the scan lines, wherein one of the pixels in an i-th row (i being a natural number of 2 or more) includes a first transistor connected between a first driving power node for receiving a first power voltage and a second node, and having a gate electrode connected to a first node, a second transistor connected between the data line and a third node, and having a gate electrode electrically connected to a first scan line in an i-th row, a third transistor connected between the first node and the second node, and having a gate electrode electrically connected to a second scan line in an (i−1)-th row, a fourth transistor connected between an initialization power node for receiving an initialization power and the first node, and having a gate electrode electrically connected to a third scan line in the i-th row, a fifth transistor connected between a reference power node for receiving a reference power and the third node, and having a gate electrode electrically connected to a second scan line in the i-th row, a sixth transistor connected between the second node and a fourth node, and having a gate electrode electrically connected to the light emission control line, and a light-emitting element connected to the fourth node, wherein, in a non-emission period in which the sixth transistor is turned off, a second scan signal for the (i−1)-th row is configured to be applied to a gate electrode of the third transistor through the second scan line of the (i−1)-th row, and wherein a second scan signal for the i-th row is configured to be applied to a gate electrode of the fifth transistor through the second scan line in the i-th row after the second scan signal for the (i−1)-th row is applied.

The third transistor and the fifth transistor may include P-type transistors, wherein a voltage of the first node is configured to rise to a first voltage due to a first kickback phenomenon at a rising edge of the second scan signal for the (i−1)-th row, and wherein a voltage of the first node is configured to rise from the first voltage to a second voltage due to a second kickback phenomenon at a rising edge of the second scan signal for the i-th row.

The second voltage may be configured to be applied to the first transistor for a bias period after the second scan signal is applied to the second scan line in the i-th row.

The bias period may be equal to or greater than one horizontal period.

The display device may further include a seventh transistor connected between the initialization power node and the fourth node, and having a gate electrode electrically connected to a fourth scan line, a second capacitor connected between the first node and the third node, and a first capacitor connected between the first driving power node and the third node.

In the non-emission period, the second scan signal for the (i−1)-th row may be configured to be applied during a first period, the second scan signal for the i-th row may be configured to be applied during a second period after the first period, and a first scan signal may be configured to be applied to the first scan line during a third period after the second period, wherein the bias period is a period between the second period and the third period.

In the non-emission period, the second scan signal for the i-th row and the second scan signal for the (i−1)-th row may be respectively applied in a fourth period and a fifth period between the bias period and the third period.

During the first period, the third transistor may be configured to be turned on, and a voltage obtained by subtracting a threshold voltage of the first transistor from the first power voltage may be configured to be applied to a gate electrode of the first transistor.

During a sixth period after the second period, the fourth transistor may be configured to be turned on, and a voltage of the initialization power may be configured to be applied to a gate electrode of the first transistor.

According to one or more embodiments of the present disclosure, an electronic device includes a display device including pixels, and a processor configured to control the display device, wherein one of the pixels in an i-th row (i being a natural number of 2 or more) includes a first transistor connected between a first driving power node for receiving a first power voltage and a second node, and having a gate electrode connected to a first node, a second transistor connected between a data line and a third node, and having a gate electrode electrically connected to a first scan line in an i-th row, a third transistor connected between the first node and the second node, and having a gate electrode electrically connected to a second scan line in an (i−1)-th row, a fourth transistor connected between an initialization power node for receiving an initialization power and the first node, and having a gate electrode electrically connected to a third scan line in the i-th row, a fifth transistor connected between a reference power node for receiving a reference power and the third node, and having a gate electrode electrically connected to a second scan line in the i-th row, a sixth transistor connected between the second node and a fourth node, and having a gate electrode electrically connected to a light emission control line, and a light-emitting element connected to the fourth node, wherein, in a non-emission period in which the sixth transistor is turned off, a second scan signal for the (i−1)-th row is configured to be applied to a gate electrode of the third transistor through the second scan line in the (i−1)-th row, and wherein, after the second scan signal for the (i−1)-th row is applied, a second scan signal for the i-th row is configured to be applied to a gate electrode of the fifth transistor through the second scan line in the i-th row.

The aspects of the present disclosure are not limited to the above-mentioned problems, and other aspects that are not mentioned may be clearly understood by those skilled in the art from the following description.

According to embodiments of the present disclosure, a pixel, a display device, and an electronic device having improved display quality are provided.

The aspects according to the embodiments are not limited by the content illustrated above, and more various aspects are included in the present specification.

DETAILED DESCRIPTION

Figure 1:
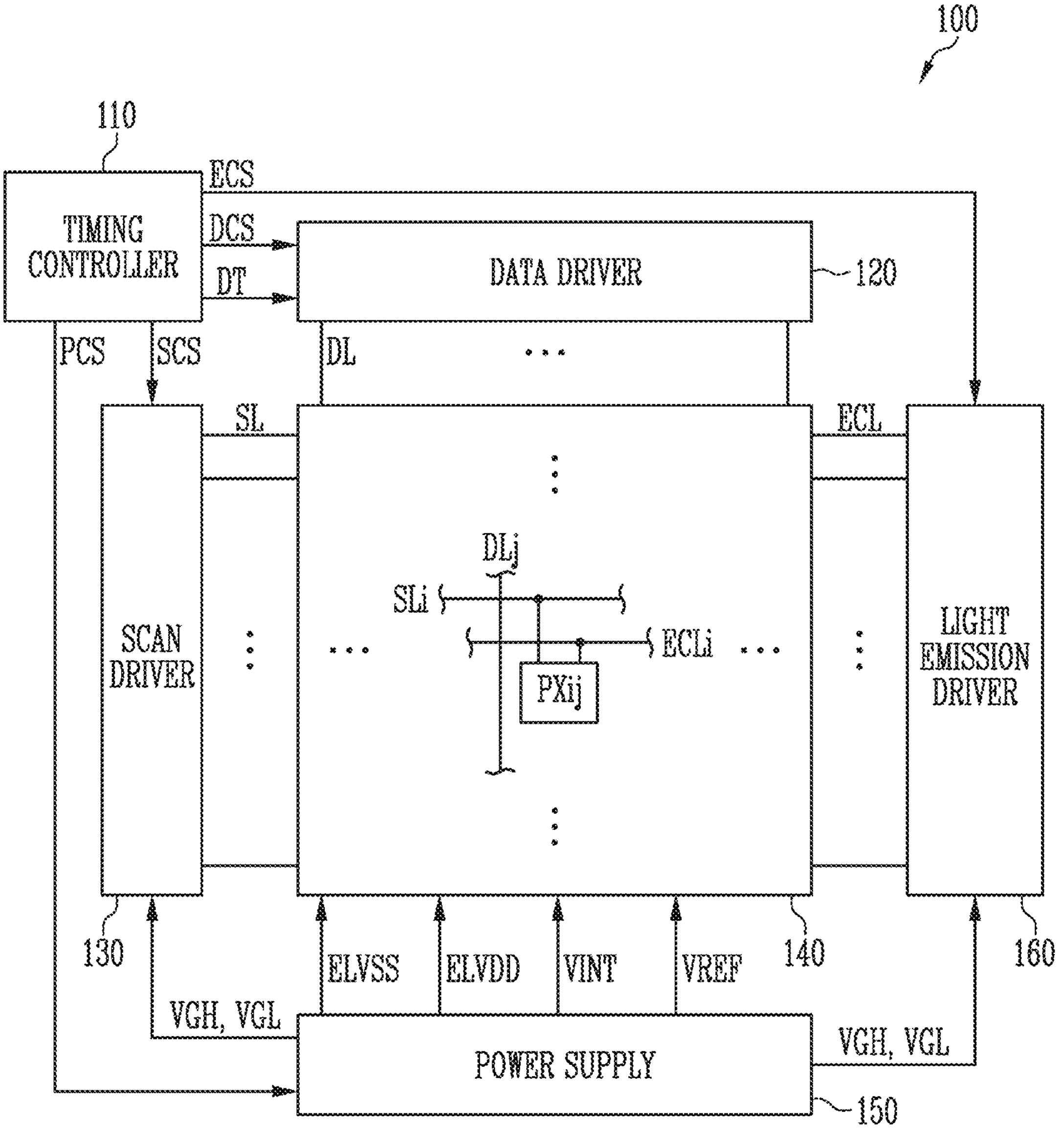
FIG. 1 is a block diagram illustrating a display device according to one or more embodiments of the present disclosure.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The use of "can," "may," or "may not" in describing an embodiment corresponds to one or more embodiments of the present disclosure.

A person of ordinary skill in the art would appreciate, in view of the present disclosure in its entirety, that each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner unless otherwise stated or implied.

In the drawings, the relative sizes of elements, layers, and regions may be exaggerated for clarity and/or descriptive purposes. In other words, because the sizes and thicknesses of elements in the drawings are arbitrarily illustrated for convenience of description, the disclosure is not limited thereto. Various embodiments are described herein with reference to sectional illustrations that are schematic illustrations of embodiments and/or intermediate structures. As such, variations from the shapes of the illustrations as a result of, for example, manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the illustrated shapes of elements, layers, or regions, but are to include deviations in shapes that result from, for instance, manufacturing.

It will be understood that when an element, layer, region, or component (e.g., an apparatus, a device, a circuit, a wire, an electrode, a terminal, a conductive film, etc.) is referred to as being "formed on," "on," "connected to," or "(operatively, functionally, or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection.

For example, when a layer, region, or component is referred to as being "electrically connected" or "electrically coupled" to another layer, region, or component, it can be directly electrically connected or coupled to the other layer, region, and/or component or one or more intervening layers, regions, or components may be present. The one or more intervening components may include a switch, a transistor, a resistor, an inductor, a capacitor, a diode and/or the like. Accordingly, a connection is not limited to the connections illustrated in the drawings or the detailed description and may also include other types of connections. In describing embodiments, an expression of connection indicates electrical connection unless explicitly described to be direct connection, and "directly connected/directly coupled," or "directly on," refers to one component directly connecting or coupling another component, or being on another component, without an intermediate component.

Meanwhile, other expressions describing relationships between components, such as "between," "immediately between" or "adjacent to" and "directly adjacent to," may be construed similarly. It will be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XY, YZ, and XZ, or any variation thereof. Similarly, the expressions "at least one of A and B" and "at least one of A or B" may include A, B, or A and B. As used herein, "or" generally means "and/or," and the term "and/or" includes any and all combinations of one or more of the associated listed items. For example, the expression "A and/or B" may include A, B, or A and B. Similarly, expressions such as "at least one of," "a plurality of," "one of," and other prepositional phrases, when preceding a list of elements, modify the entire list of elements and do not modify the individual elements of the list. When "C to D" is stated, it means C or more and D or less, unless otherwise specified.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are only used to distinguish one element, member, component, region, area, layer, section, or portion from another element, member, component, region, area, layer, section, or portion. Thus, a first element, component, region, layer, or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the terms "substantially," "about," "approximately," and similar terms are used as terms of approximation and not as terms of degree, and are intended to account for the inherent deviations in measured or calculated values that would be recognized by those of ordinary skill in the art. For example, "substantially" may include a range of +/−5% of a corresponding value. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure." Furthermore, the expression "being the same" may mean "being substantially the same". In other words, the expression "being the same" may include a range that can be tolerated by those of ordinary skill in the art. The other expressions may also be expressions from which "substantially" has been omitted.

In some embodiments well-known structures and devices may be described in the accompanying drawings in relation to one or more functional blocks (e.g., block diagrams), units, and/or modules to avoid unnecessarily obscuring various embodiments. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram illustrating a display device according to one or more embodiments of the present disclosure.

Referring to FIG. 1, a display device 100 may include a timing controller 110, a data driver 120, a scan driver 130, a pixel unit 140, a power supply 150, and a light emission driver 160.

In a display mode, the display device 100 may display an image with various driving frequencies (or an image refresh rate and a screen refresh rate) according to driving conditions. A driving frequency is a frequency at which a data signal is substantially written to driving transistors of pixels. For example, the driving frequency is also referred to as a screen scan rate and a screen refresh frequency, and represents a frequency at which a display screen is refreshed for 1 second. The display device 10 may display an image corresponding to various driving frequencies of about 1 Hz to about 120 Hz.

The timing controller 110 may receive frame information and control signals from an external processor. The timing controller 110 may convert the frame information and the control signals to suit a specification of the display device 100, and may provide converted frame information and converted control signals to the data driver 120, the scan driver 130, the power supply 150, and the light emission driver 160.

For example, the timing controller 110 may transmit data-driving signals DCS and image data DT to the data driver 120. The data-driving signals DCS may include a sampling signal and/or timing signals suitable for driving the data driver 120. The data driver 120 may supply respective data signals to data lines DL based on the data-driving signals DCS and the image data DT. For example, the data driver 120 may generate data signals having analog data voltages corresponding to respective grayscale values included in the image data DT supplied as digital data, and may output the data signals to respective data lines DL. The data signals output to the data lines DL may be supplied to respective pixels.

The scan driver 130 may receive scan-driving signals SCS from the timing controller 110. The scan-driving signals SCS may include a sampling signal and/or timing signals suitable for driving the scan driver 130. The scan driver 130 may supply respective scan signals to scan lines SL based on the scan-driving signals SCS.

Each scan signal may have a gate-on voltage capable of turning on a transistor to which the scan signal is supplied. For example, the scan signal of a low level may be supplied to the P-type transistor, and the scan signal of a high level may be supplied to the N-type transistor. Accordingly, the transistor receiving each scan signal may be turned on in response to the scan signal.

The light emission driver 160 may receive light-emission-driving signals ECS from the timing controller 110. The light-emission-driving signals ECS may include a sampling signal and/or timing signals suitable for driving the light emission driver 160. The light emission driver 160 may supply respective light emission control signals to the light emission control lines ECL based on the light-emission-driving signals ECS. For example, the light emission driver 160 may sequentially supply light emission control signals to the light emission control lines ECL based on the light-emission-driving signals ECS.

Each light emission control signal may have a gate-off voltage capable of turning off a transistor to which the light emission control signal is supplied. For example, the light emission control signal of a high level may be supplied to the P-type transistor, and the light emission control signal of a low level may be supplied to an N-type transistor. Accordingly, the transistor receiving each light emission control signal may be turned off in response to the light emission control signal to maintain an off state during a period in which the light emission control signal is supplied.

FIG. 1 illustrates one or more embodiments in which the scan driver 130 and the light emission driver 160 are provided in separate configurations, but embodiments are not limited thereto. For example, the scan driver 130 and the light emission driver 160 may be integrated into one driving circuit, one module, or the like.

The power supply 150 may receive power-driving signals PCS from the timing controller 110. The power supply 150 may generate driving voltages of pixels based on the power-driving signals PCS, and may supply the driving voltages to the pixel unit 140 through respective power lines. In one or more embodiments, the power supply 150 may be or include a power management integrated circuit (PMIC). The power supply 150 may generate and supply a first power voltage ELVDD, a second power voltage ELVSS, a reference power voltage VREF, and an initialization voltage VINT to the pixel unit 140. The power supply 150 may generate and transmit a first voltage VGH and a second voltage VGL to the scan driver 130 and the light emission driver 160.

The pixel unit 140 may constitute a display panel, and the pixel unit 140 includes a plurality of pixels. For example, a pixel PXij may be electrically connected to a scan line SLi and an emission control line ECLi located in a corresponding horizontal line, and a data line DLj located in a corresponding vertical line. Although FIG. 1 shows that each pixel PXij is connected to one scan line SLi and one emission control line ECLi, embodiments are not limited thereto. For example, two or more scan lines to which different scan signals are applied or two or more emission control lines may be located in each horizontal line, and each pixel PXij may be electrically connected to the two or more scan lines or the two or more light emission control lines. The first power voltage ELVDD, the second power voltage ELVSS, and the reference power voltage VREF may be supplied to the pixel PXij.

Signal lines connected to the pixel PXij of the pixel unit 140, driving signals supplied from power lines, and driving voltages are not limited to the above, and may be variously changed.

Figure 2:
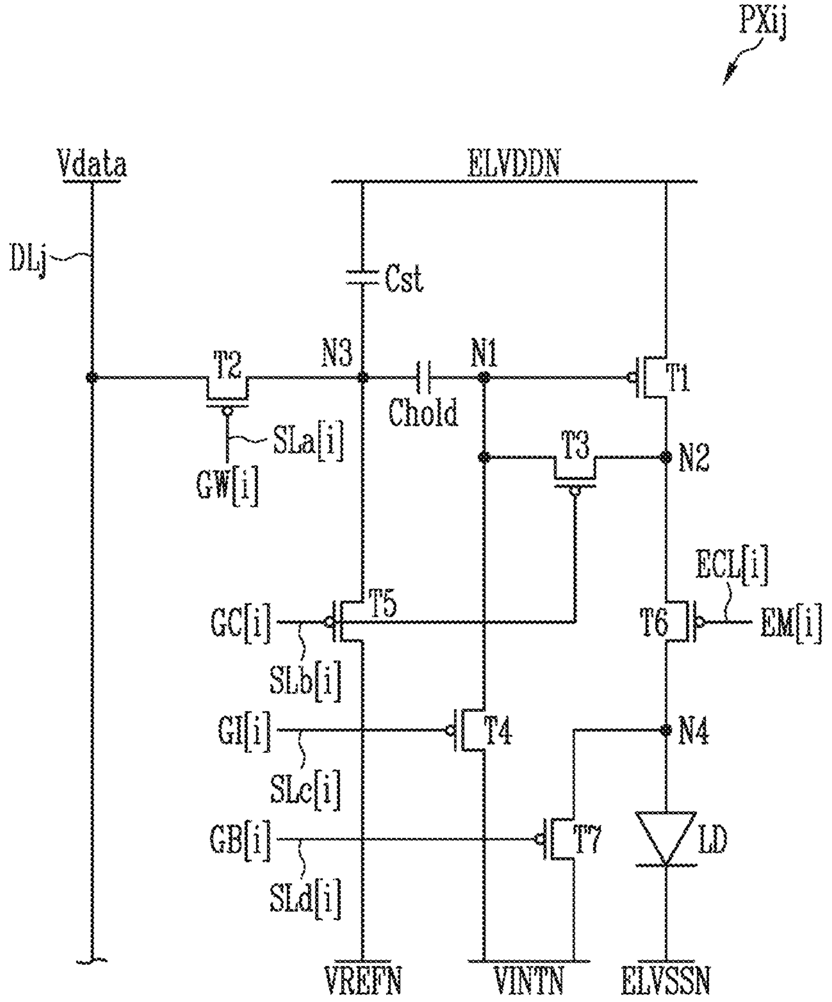
FIG. 2 is a circuit diagram illustrating one or more embodiments of a pixel illustrated in FIG. 1.

FIG. 2 is a circuit diagram illustrating one or more embodiments of a pixel illustrated in FIG. 1. Referring to FIG. 2, the pixel PXij may be connected to at least one scan line and a light emission control line arranged in a horizontal line, and a data line DLj arranged in a vertical line. The pixel PXij corresponds to an i-th horizontal line and a j-th vertical line. The pixel PXij may be connected to a first scan line SLa[i] (or an i-th first scan line SLa[i]), a second scan line SLb[i] (or an i-th second scan line SLb[i]), a third scan line SLc[i] (or an i-th third scan line SLc[i]), and a fourth scan line SLd[i] (or an i-th fourth scan line SLd[i]) in the i-th horizontal line, a light emission control line ECL[i] (or an i-th light emission control line ECL[i]) in the i-th horizontal line, and a data line DLj (or a j-th data line DLj) in the j-th vertical line.

In embodiments, the pixel PXij may include first to seventh transistors T1 to T7, a first capacitor Cst, a second capacitor Chold, and a light-emitting element LD. For example, the first to seventh transistors T1 to T7 may be low-temperature polycrystalline silicon (LTPS) transistors of a P-type. Accordingly, a gate-on voltage for turning on the first to seventh transistors T1 to T7 may be a logic low level. However, embodiments are not limited thereto.

The first transistor T1 may be connected between a first driving power node ELVDDN and a second node N2. Here, a voltage of the first driving power node ELVDDN may be the first power voltage ELVDD illustrated in FIG. 1. A gate electrode of the first transistor T1 may be connected to a first node N1. The first transistor T1 may be turned on in response to the voltage of the first node N1. The first transistor T1 may control an amount of current flowing from the first driving power node ELVDDN to a second driving power node ELVSSN via the light-emitting element LD in response to the voltage of the first node N1. Here, a voltage of the second driving power node ELVSSN may be the second power voltage ELVSS illustrated in FIG. 1. The first transistor T1 may be referred to as a driving transistor.

The second transistor T2 may be connected between the j-th data line DLj and a third node N3. A gate electrode of the second transistor T2 may be connected to the i-th first scan line SLa[i]. The second transistor T2 may be turned on in response to a first scan signal GW[i] applied through the i-th first scan line SLa[i]. The second transistor T2 may be referred to as a switching transistor.

The third transistor T3 may be connected between the first node N1 and the second node N2. A gate electrode of the third transistor T3 may be connected to the i-th second scan line SLb[i]. The third transistor T3 may be turned on in response to a second scan signal GC[i] applied through the i-th second scan line SLb[i].

The fourth transistor T4 may be connected between the first node N1 and an initialization power node VINTN. Here, a voltage of the initialization power node VINTN may be the initialization voltage VINT illustrated in FIG. 1. The first node N1 may be a node connected to the gate electrode of the first transistor T1. The initialization power node VINTN may be configured to deliver an initialization voltage. In embodiments, the initialization voltage VINT may be provided by the power supply 150 of FIG. 1. In other embodiments, the initialization voltage may be provided by an external device.

A gate electrode of the fourth transistor T4 may be connected to the i-th third scan line SLc[i]. The fourth transistor T4 may be turned on in response to a third scan signal GI[i] applied through the i-th third scan line SLc[i]. The fourth transistor T4 may be turned on to apply a voltage of the initialization power node VINTN to the first node N1. Here, when the voltage of the initialization power node VINTN becomes higher than a corresponding reference, a parasitic capacitor of the light-emitting element LD may be charged, rather than discharged. Accordingly, the voltage of the initialization power node VINTN may be set to a level that is lower than the voltage of the second driving power node ELVSSN.

The fifth transistor T5 may be connected between the third node N3 and a reference power node VREFN. Here, a voltage of the reference power node VREFN may be the reference power voltage VREF shown in FIG. 1. A gate electrode of the fifth transistor T5 may be connected to the i-th second scan line SLb[i]. The fifth transistor T5 may be turned on in response to a second scan signal GC[i] applied through the i-th second scan line SLb[i]. The fifth transistor T5 may be turned on to apply the voltage of the reference power node VREFN to the third node N3.

In the one or more embodiments corresponding to FIG. 2, the gate electrode of the fifth transistor T5 may be connected to the gate electrode of the third transistor T3. The fifth transistor T5 may be controlled to be substantially the same as the third transistor T3 through the second control signal GC[i].

The sixth transistor T6 may be connected between the second node N2 and a fourth node N4. The second node N2 may be a node connected to one electrode (e.g., a drain electrode) of the first transistor T1. The fourth node N4 may be a node connected to an anode electrode of the light-emitting element LD. A gate electrode of the sixth transistor T6 may be connected to the i-th light emission control line ECL[i]. The sixth transistor T6 may be turned on in response to a light emission control signal EM[i] applied through the i-th light emission control line ECL[i].

The seventh transistor T7 may be connected between the fourth node N4 and the initialization power node VINTN. A gate electrode of the seventh transistor T7 may be connected to the i-th fourth scan line SLd[i]. The seventh transistor T7 may be turned on in response to a fourth scan signal GB[i] applied through the i-th fourth scan line SLd[i]. The seventh transistor T7 may be turned on to apply the voltage of the initialization power node VINTN to the anode electrode of the light-emitting element LD.

The first capacitor Cst may be connected between the first driving power node ELVDDN and the third node N3. The first capacitor Cst may store a voltage applied to the third node N3.

The second capacitor Chold may be connected between the first node N1 and the third node N3. The second capacitor Chold may store a difference voltage between the first node N1 and the third node N3. For example, the second capacitor Chold may store a voltage corresponding to a data signal and a threshold voltage of the first transistor T1.

The light-emitting device LD may include the anode electrode, a cathode electrode, and a light-emitting layer. The light-emitting layer may be positioned between the anode electrode and the cathode electrode. After the data signal transmitted through the j-th data line DLj is reflected in the voltage of the first node N1, when the light emission control signal EM[i] is applied to the i-th light emission control line ECL[i], the first and sixth transistors T1 and T6 may be turned on. The light-emitting element LD may emit light according to the amount of current flowing from the first driving power node ELVDDN to the second driving power node ELVSSN.

Figure 3:
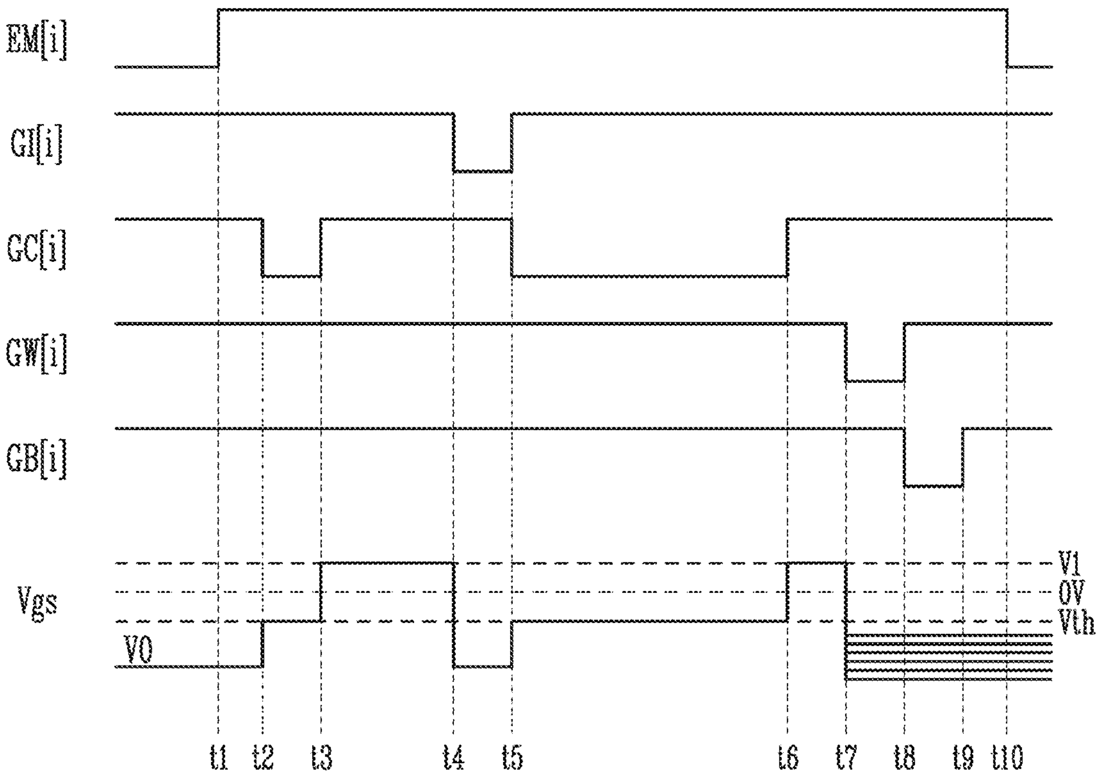
FIG. 3 is a timing diagram illustrating one or more embodiments of signals supplied to the pixel of FIG. 2.

FIG. 3 is a timing diagram illustrating one or more embodiments of signals supplied to the pixel of FIG. 2. In FIG. 3, signals supplied to the pixel PXij during a non-emission period for the i-th horizontal line are shown. The non-emission period for the i-th horizontal line may be a period in which the i-th emission control signal EM[i] applied to the i-th emission control line ECL[i] has a logic high level. An emission period for the i-th horizontal line may be a period in which the emission control signal EM[i] applied to the i-th emission control line ECL[i] has a logic low level. That is, a period (t1 to t10) in FIG. 3 are the non-emission period.

According to one or more embodiments, the second scan signal GC[i] may be applied a plurality of times within the non-emission period (t1 to t10). For example, the second scan signal GC[i] may be applied during a period (t2 to t3) and during a period (t5 to t6). In this case, after the period (t2 to t3) in which the second scan signal GC[i] is applied, a period (t3 to t4) in which an off-bias voltage V1 is applied to the first transistor T1 may be provided. The period (t3 to t4) may be referred to as a first bias period. By maintaining the first bias period (t3 to t4) by a preset length, an influence of a previous data can be further reduced.

In the period (t2 to t3), the second scan signal GC[i] may be applied to the i-th second scan line SLb[i]. In the period (t2 to t3), the second scan signal GC[i] with a logic low level voltage may be applied to the gate electrode of each of the third and fifth transistors T3 and T5. The third and fifth transistors T3 and T5 may be turned on in response to the second scan signal GC[i].

In this case, the first transistor T1 may be diode-connected by the third transistor T3 that is turned-on. A difference voltage reduced by a threshold voltage Vth of the first transistor T1 from the voltage of the first driving power node ELVDDN may be applied to the gate electrode of the first transistor T1. Here, the difference voltage between the voltage of the first driving power node ELVDDN and the threshold voltage Vth of the first transistor T1 may be a compensation voltage that compensates for the threshold voltage Vth of the first transistor T1.

In the period (t2 to t3), as the compensation voltage is applied to the gate electrode of the first transistor T1, a voltage Vgs between the gate electrode and a source electrode of the first transistor T1 may have the threshold voltage Vth. After the period (t2 to t3), in the first bias period (t3 to t4), an application of the second scan signal GC[i] may be stopped. In the first bias period (t3 to t4), the second scan signal GC[i] may be applied to the gate electrode of each of the third and fifth transistors T3 and T5 with a logic high level voltage. The third and fifth transistors T3 and T5 may be turned off in response to the second scan signal GC[i].

At a start time point t3 of the first bias period (t3 to t4), the second scan signal GC[i] may transition from a logic low level to a logic high level. A kickback phenomenon in which the voltage of the first node N1 rises may occur at a rising edge of the second scan signal GC[i]. Due to a voltage rise of the first node N1, in the first bias period (t3 to t4), the voltage Vgs between the gate electrode and the source electrode of the first transistor T1 may have the off-bias voltage V1 (e.g., a first voltage, in the claims). Here, the off-bias voltage V1 may be a voltage at which the first transistor T1 can be turned off. For example, the off-bias voltage V1 may have a positive voltage. Accordingly, the first transistor T1 may be in an off-bias state. In addition, by using the kickback phenomenon at the rising edge of the second scan signal GC[i], the voltage Vgs between the gate electrode and the source electrode of the first transistor T1 may have a constant voltage regardless of a previous data voltage.

In a period (t4 to t5), the third scan signal GI[i] may be applied to the i-th third scan line SLc[i]. In the period (t4 to t5), the third scan signal GI[i] may be applied to the gate electrode of the fourth transistor T4 with a logic low level voltage. The fourth transistor T4 may be turned on in response to the third scan signal GI[i].

The voltage of the initialization power node VINTN may be applied to the gate electrode of the first transistor T1 through the fourth transistor T4 that is turned-on. The first node N1 connected to the gate electrode of the first transistor T1 may be initialized with the voltage of the initialization power node VINTN, that is, the initialization voltage VINT. The initialization voltage VINT may have a negative voltage that is lower than the voltage of the second driving power node ELVSSN. The period (t4 to t5) may be referred to as an initialization period.

In the initialization period (t4 to t5), as the initialization voltage VINT is applied to the gate electrode of the first transistor T1, the voltage Vgs between the gate electrode and the source electrode of the first transistor T1 may have an on-bias voltage V0. Here, the on-bias voltage V0 may be a voltage at which the first transistor T1 can be turned on. For example, the on-bias voltage V0 may have a negative voltage. The on-bias voltage V0 may be lower than the threshold voltage Vth. Accordingly, the first transistor T1 may be in an on-bias state.

According to one or more embodiments, in case that the on-bias voltage V0 is continuously applied as the voltage Vgs between the gate electrode and the source electrode of the first transistor T1, a hole (e.g., a positive electric charge) may be trapped in a gate-insulating film under the gate electrode. An afterimage, such as image dragging, may be visually recognized due to a change in a bias state of the first transistor T1 due to hole trapping, a shift in the threshold voltage Vth according to a change in hysteresis characteristics, or the like. To improve the afterimage, by alternately applying the on-bias voltage V0 and the off-bias voltage V1 as the voltage Vgs between the gate electrode and the source electrode of the first transistor T1, the occurrence of hole trapping can be reduced.

For example, between the period (t2 to t3) and the period (t4 to t5), the first transistor T1 may be maintained in the off-bias state. For example, there may be the first bias period (t3 to t4) in which scan signals are not supplied between the period (t2 to t3) and the period (t4 to t5). The first bias period (t3 to t4) may be a period in which the voltage Vgs between the gate electrode and the source electrode of the first transistor T1 has the off-bias voltage V1 due to a kickback phenomenon of the second scan signal GC[i]. However, the first bias period (t3 to t4) should be set to have sufficient time. For example, the first bias period (t3 to t4) is a period from a time point t3 at which the application of the second scan signal GC[i] is stopped to a time point t4 at which application of the third scan signal GI[i] is started, and may be equal to or greater than one horizontal period. By maintaining the first bias period (t3 to t4) equal to or greater than one horizontal period, the off-bias voltage V1 may be sufficiently applied to the first transistor T1. Through this, the occurrence of hole traps can be effectively reduced, thereby alleviating or eliminating the afterimage.

Here, one horizontal period may mean a time period in which data signals are applied to pixels in each row. For example, the horizontal period may be a time period during which the first scan signal GW[i] has a gate-on voltage. For example, the horizontal period may be a time period in which a data signal corresponding to the pixel PXij is applied to the j-th data line DLj.

After the initialization period (t4 to t5), in a period (t5 to t6), the second scan signal GC[i] may be applied to the i-th second scan line SLb[i]. In the period (t5 to t6), the second scan signal GC[i] may be applied to the gate electrode of each of the third and fifth transistors T3 and T5 with a logic low level voltage. The third and fifth transistors T3 and T5 may be turned on in response to the second scan signal GC[i].

In this case, a difference voltage reduced by the threshold voltage Vth of the first transistor T1 from the voltage of the first driving power node ELVDDN, that is, the first power voltage ELVDD, may be applied to the gate electrode of the first transistor T1. During the period (t5 to t6), as the application of the second scan signal GC[i] is maintained, the threshold voltage Vth of the first transistor T1 may be compensated for a sufficient time.

In the period (t5 to t6), as a compensation voltage is applied to the gate electrode of the first transistor T1, the voltage Vgs between the gate electrode and the source electrode of the first transistor T1 may have the threshold voltage Vth.

After the period (t5 to t6), in a period (t6 to t7), the application of the second scan signal GC[i] may be stopped. The period (t6 to t7) may be referred to as a second bias period. In the second bias period (t6 to t7), the second scan signal GC[i] may be applied to the gate electrode of each of the third and fifth transistors T3 and T5 with a logic high level voltage. The third and fifth transistors T3 and T5 may be turned off in response to the second scan signal GC[i].

At a start time point t6 of the second bias period (t6 to t7), the second scan signal GC[i] may transition from a logic low level to a logic high level. A kickback phenomenon in which the voltage of the first node N1 rises may occur at a rising edge of the second scan signal GC[i]. Due to a voltage rise of the first node N1, in the second bias period (t6 to t7), the voltage Vgs between the gate electrode and the source electrode of the first transistor T1 may have the off-bias voltage V1. Accordingly, the first transistor T1 may be in the off-bias state.

After the second bias period (t6 to t7), in a period (t7 to t8), the first scan signal GW[i] may be applied to the i-th first scan line SLa[i]. In periods t7 to t8, the first scan signal GW[i] may be applied to the gate electrode of the second transistor T2 with a logic low level voltage. The second transistor T2 may be turned on in response to the first scan signal GW[i]. The second transistor T2 that is turned-on may transfer a data voltage Vdata corresponding to the data signal to one electrode (e.g., a source electrode) of the fifth transistor T5. Accordingly, the voltage of the third node N3 may be the data voltage. Accordingly, the voltage Vgs between the gate electrode and the source electrode of the first transistor T1 may be a different voltage depending on the data voltage. Thus, in FIG. 3, the voltage Vgs between the gate electrode and the source electrode of the first transistor T1 is indicated by several lines after a time point t7. This means that the voltage Vgs between the gate electrode and the source electrode of the first transistor T1 after the time point t7 is determined according to the data voltage. The period (t7 to t8) may be referred to as a data-writing period.

The voltage of the first driving power node ELVDDN and the data voltage may be applied to both ends of the first capacitor Cst. The first capacitor Cst may store a difference voltage between the voltage of the first driving power node ELVDDN and the data voltage.

The difference voltage between the compensation voltage of the first transistor T1 and the data voltage may be stored in the second capacitor Chold.

After the data-writing period (t7 to t8), in a period (t8 to t9), the fourth scan signal GB[i] may be applied to the i-th fourth scan line SLd[i]. In the period (t8 to t9), the fourth scan signal GB[i] may be applied to the gate electrode of the seventh transistor T7 with a logic low level voltage. The seventh transistor T7 may be turned on in response to the fourth scan signal GB[i]. The seventh transistor T7 that is turned-on may transfer the voltage of the initialization power node VINTN to the anode electrode of the light-emitting element LD (or the fourth node N4). In this case, a threshold voltage of the light-emitting element LD may be compensated.

Figure 4:
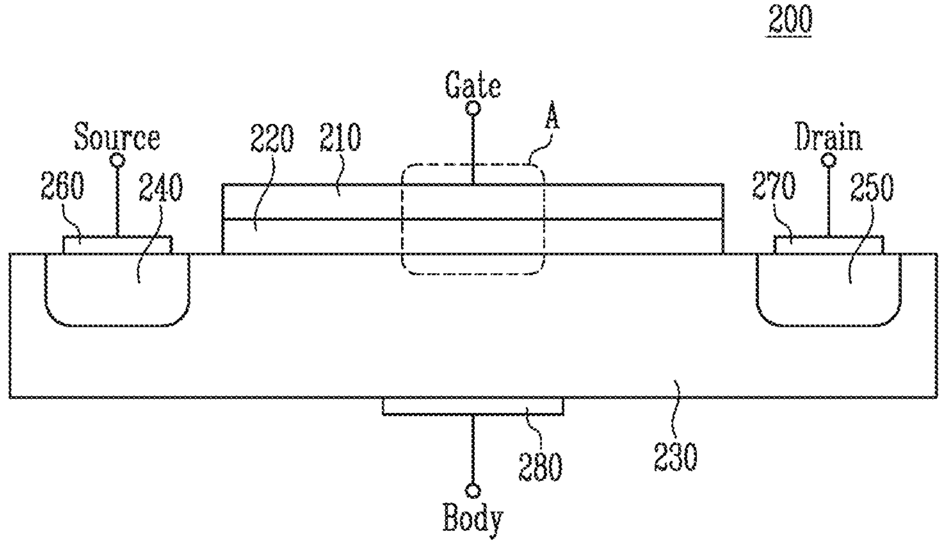
FIG. 4 is a diagram illustrating a structure of a first transistor of FIG. 2.

FIG. 4 is a diagram illustrating a structure of a first transistor of FIG. 2. FIG. 4 illustrates a P-type transistor structure. However, FIG. 4 is an example, and the first transistor T1 may be formed in a transistor structure of a type that is different from that of FIG. 4.

As shown in FIG. 4, the first transistor T1 or 200 may include a gate electrode 210, a gate-insulating film 220, an active region 230, a source region 240, a drain region 250, a source electrode 260, a drain electrode 270, and a body electrode 280. In one or more embodiments, the active region 230 may be an N-well formed on a P-type substrate.

As described above, in case that the on-bias voltage V0 is continuously applied as the voltage Vgs between the gate electrode and the source electrode of the first transistor T1, a hole (e.g., a positive electric charge) may be trapped in the gate-insulating film 220. An afterimage, such as image dragging, may be visually recognized due to a change in the bias state of the first transistor T1 due to hole trapping, a shift in the threshold voltage Vth according to a change in hysteresis characteristics, or the like. To improve this after-image, by alternately applying the on-bias voltage V0 and the off-bias voltage V1 as the voltage Vgs between the gate electrode and the source electrode of the first transistor T1, the occurrence of hole trapping can be reduced.

Hereinafter, an operation of reducing a charge trap phenomenon occurring in a region A will be described with reference to FIGS. 5A and 5B.

Figure 5A:
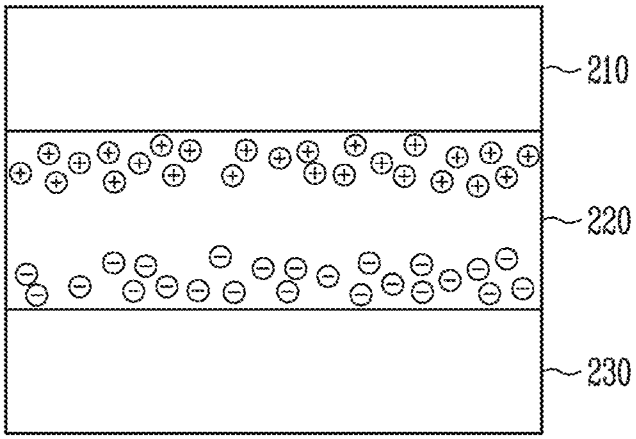
FIGS. 5A and 5B are diagrams for describing an operation of reducing a charge trap phenomenon occurring in a gate-insulating film of a first transistor.
Figure 5B:
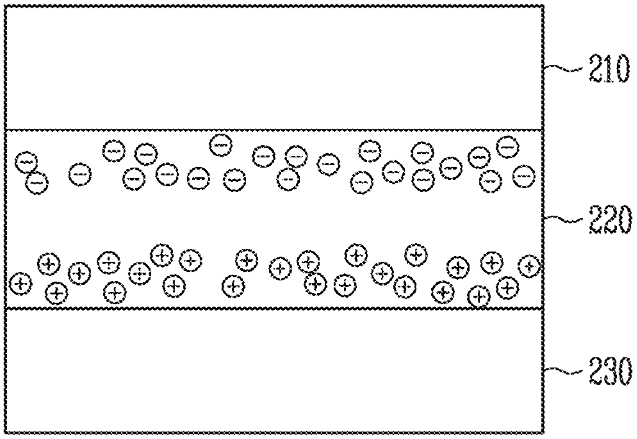

FIGS. 5A and 5B are diagrams for describing an operation of reducing a charge trap phenomenon occurring in a gate-insulating film of a first transistor.

Referring to FIG. 5A, in case that the on-bias voltage V1 is applied as the voltage Vgs between the gate electrode and the source electrode of the first transistor T1 or 200, a hole trapped in the gate-insulating film 220 may move toward the gate electrode. Referring to FIG. 5B, in case that the off-bias voltage V1 is applied as the voltage Vgs between the gate electrode and the source electrode of the first transistor T1 or 200, the hole trapped in the gate-insulating film 220 may move toward the active region.

As shown in FIGS. 5A and 5B, the charge trap phenomenon occurring in the region A may be reduced by alternately applying the on-bias voltage V0 and the off-bias voltage V1 as the voltage Vgs between the gate electrode and the source electrode of the first transistor T1.

However, to effectively reduce the charge trap phenomenon occurring in the region A, the first bias period (t3 to t4) shown in FIG. 3 should be sufficiently long. As the first bias period (t3 to t4) is longer, the influence of the previous data can be further reduced.

However, in case that the first bias period (t3 to t4) is set to be long, a total non-emission period (t1 to t10) may be long. This may act as a disadvantageous factor for a high-speed operation of the display device 100. Therefore, to effectively reduce the charge trap phenomenon during the first bias period (t3 to t4), which is limited, it is suitable to further increase the voltage Vgs between the gate electrode and the source electrode of the first transistor T1 during the first bias period (t3 to t4).

According to a pixel according to one or more embodiments of the present disclosure, a gate electrode of the third transistor T3 and a gate electrode of a fifth transistor T5 may be separated and connected to different respective scan lines. Thereby, by controlling the third transistor T3 and the fifth transistor T5 to be turned on at different time points, the voltage Vgs between the gate electrode and the source electrode of the first transistor T1 may be further increased during the first bias period. As a result, it is possible to effectively reduce the charge trap phenomenon during a limited first bias period.

Figure 6:
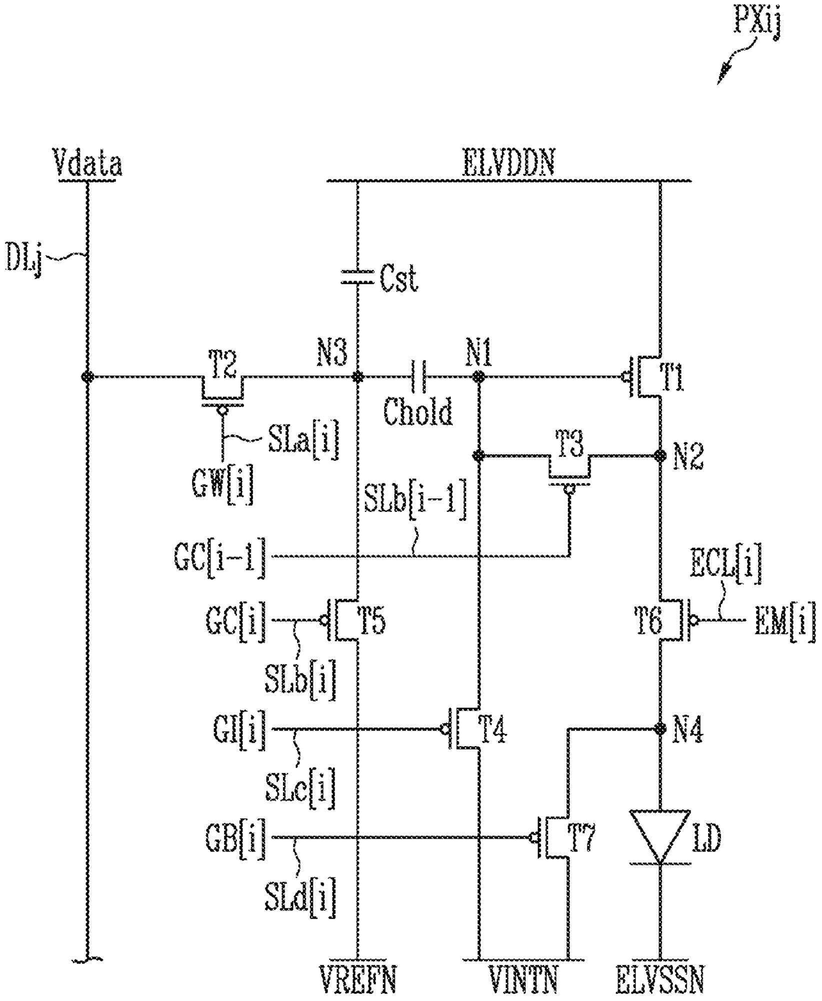
FIG. 6 is a circuit diagram illustrating one or more embodiments of a pixel illustrated in FIG. 1.

FIG. 6 is a circuit diagram illustrating one or more embodiments of a pixel illustrated in FIG. 1. Hereinafter, redundant descriptions with FIG. 2 will be omitted.

Referring to FIG. 6, the pixel PXij may be connected to at least one scan line and a light emission control line arranged in a horizontal line, and a data line DLj arranged in a vertical line. The pixel PXij corresponds to an i-th horizontal line and a j-th vertical line. The pixel PXij may be connected to a first scan line SLa[i], a second scan line SLb[i], a third scan line SLc[i], and a fourth scan line SLd[i] in the i-th horizontal line, a light emission control line ECL[i] in the i-th horizontal line, and the data line DLj in the j-th vertical line. Additionally, the pixel PXij shown in FIG. 6 may be further connected to a second scan line SLb[i−1] in an (i−1)-th horizontal line.

In embodiments, the pixel PXij may include first to seventh transistors T1 to T7, a first capacitor Cst, a second capacitor Chold, and a light-emitting element LD. For example, the first to seventh transistors T1 to T7 may be low-temperature polycrystalline silicon (LTPS) transistors of a P-type. Accordingly, a gate-on voltage for turning on the first to seventh transistors T1 to T7 may be a logic low level. However, embodiments are not limited thereto.

Comparing the pixel of FIG. 6 with the pixel of FIG. 2, except for a signal line connected to the gate electrode of the third transistor T3, connection relationships of other components are all the same. That is, in the pixel of FIG. 2, both the gate electrode of the third transistor T3 and the gate electrode of the fifth transistor T5 are commonly connected to the second scan line SLb[i] in the i-th horizontal line, whereas in the pixel of FIG. 6, the gate electrode of the third transistor T3 may be connected to the second scan line SLb[i−1] in the (i−1)-th horizontal line, and the gate electrode of the fifth transistor T5 may be connected to the second scan line SLb[i] in the i-th horizontal line.

According to one or more embodiments of the present disclosure, the third transistor T3 may be first turned on and off before an entry of the first bias period in the non-emission period, and then the fifth transistor T5 may be turned on and off. Accordingly, it is possible to further increase the voltage Vgs between the gate electrode and the source electrode of the first transistor during the first bias period by using a kickback phenomenon of a scan signal applied to the gate electrode of the third transistor T3 and a kickback phenomenon of a scan signal applied to the gate electrode of the fifth transistor T5 at different time points.

In FIG. 6, the gate electrode of the third transistor T3 is shown to be connected to the second scan line SLb[i−1] in the (i−1)-th horizontal line, but the present disclosure is not limited thereto. For example, the gate electrode of the third transistor T3 may be connected to a separate fifth scan line and controlled independently of scan lines in the (i−1)-th row. In this case, a fifth scan signal may be applied through the fifth scan line. Hereinafter, the operation of the present disclosure will be described with reference to one or more embodiments in which the gate electrode of the third transistor T3 is connected to the second scan line SLb[i−1] in the (i−1)-th horizontal line.

Figure 7:
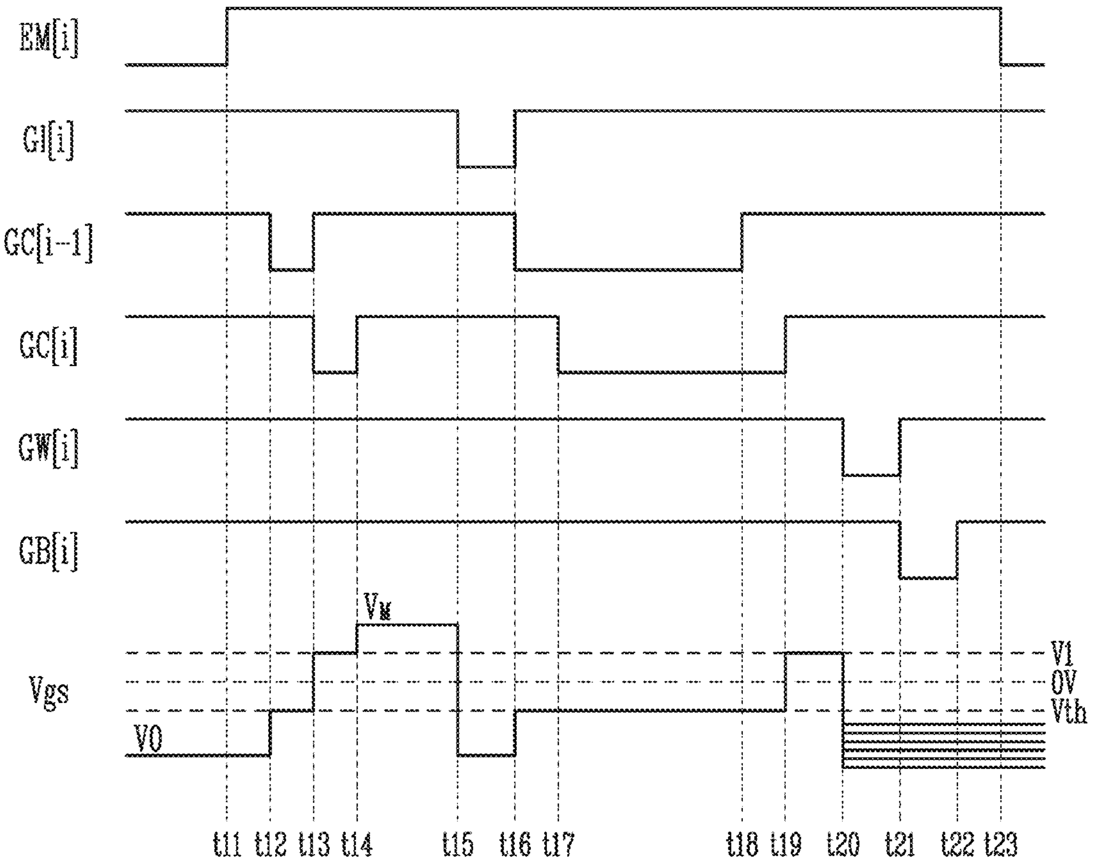
FIG. 7 is a timing diagram illustrating one or more embodiments of signals supplied to the pixel of FIG. 6.

FIG. 7 is a timing diagram illustrating one or more embodiments of signals supplied to the pixel of FIG. 6. Hereinafter, redundant descriptions with FIG. 3 will be omitted.

In FIG. 7, signals supplied to the pixel during a non-emission period for the i-th horizontal line are shown. The non-emission period for the i-th horizontal line may be a period in which the emission control signal applied to the i-th emission control line ECLi has a logic high level. The non-emission period of the i-th horizontal line may be a period in which the emission control signal EM[i] applied to the i-th emission control line ECL[i] has a logic low level. That is, a period (t11 to t23) in FIG. 7 is the non-emission period.

According to one or more embodiments, the second scan signal GC[i−1] in the (i−1)-th row and the second scan signal GC[i] in the i-th row may be applied a plurality of times in the non-emission period (t11 to t23). For example, the second scan signal GC[i−1] in the (i−1)-th row may be applied to a period (t12 to t13, e.g., a first period, in the claims) and a period (t16 to t18, e.g., a fourth period, in the claims). The second scan signal GC[i] in the i-th row may be applied to a period (t13 to t14, e.g., a second period, in the claims) and a period (t17 to t19, e.g., a fifth period, in the claims).

In this case, a period (t14 to t15) in which an off-bias voltage $V_M$ is applied to the first transistor T1 may be provided after the period (t13 to t14) in which the second scan signal GC[i] in the i-th row is applied. The period (t14 to t15) may be referred to as a first bias period. By increasing a magnitude of the off-bias voltage $V_M$ within the first bias period (t14 to t15), which is limited, the influence of the previous data can be further reduced.

In the period (t12 to t13), the second scan signal GC[i−1] in the (i−1)-th row may be applied to the second scan line SLb[i−1] in the (i−1)-th row. Accordingly, in the period (t12 to t13), the third transistor T3 may be turned on. In this case, the first transistor T1 may be diode-connected by the third transistor T3 which is turned-on. A difference voltage reduced by the threshold voltage Vth of the first transistor T1 from the voltage of the first driving power node ELVDDN may be applied to the gate electrode of the first transistor T1. Here, the difference voltage between the voltage of the first driving power node ELVDDN and the threshold voltage Vth of the first transistor T1 may be a compensation voltage that compensates for the threshold voltage Vth of the first transistor T1.

In the period (t12 to t13), as the compensation voltage is applied to the gate electrode of the first transistor T1, the voltage Vgs between the gate electrode and the source electrode of the first transistor T1 may have the threshold voltage Vth. After the period (t12 to t13), in a period (t13 to t14), an application of the second scan signal GC[i−1] in the (i−1)-th row may be stopped. Accordingly, the third transistor T3 may be turned off in the period (t13 to t14).

At a start time point t13 of the period (t13 to t14), the second scan signal GC[i−1] in the (i−1)-th row may transition from a logic low level to a logic high level. A primary kickback phenomenon in which the voltage of the first node N1 rises may occur at the rising edge of the second scan signal GC[i−1] in the (i−1)-th row. Due to a voltage rise of the first node N1, in the period t13 to t14, the voltage Vgs between the gate electrode and the source electrode of the first transistor T1 may have a first off-bias voltage V1. Here, the first off-bias voltage V1 may have a positive voltage. Accordingly, the first transistor T1 may be in an off-bias state.

In the period (t13 to t14), the second scan signal GC[i] in the i-th row may be applied to the second scan line SLb[i] in the i-th row. Accordingly, in the period (t13 to t14), the fifth transistor T5 is turned on. In this case, the reference voltage VREF of the reference power node VREFN may be transmitted to the third node N3. After the period (t13 to t14), in a period (t14 to t15), the application of the second scan signal GC[i] in the i-th row may be stopped. Accordingly, the fifth transistor T5 may be turned off in the period (t14 to t15).

At a start time point t14 of the period (t14 to t15), the second scan signal GC[i] in the i-th row may transition from a logic low level to a logic high level. A secondary kickback phenomenon in which the voltage of the first node N1 rises may occur at the rising edge of the second scan signal GC[i] in the i-th row. Due to a voltage rise of the first node N1, in the period (t14 to t15), the voltage Vgs between the gate electrode and the source electrode of the first transistor T1 may have a second off-bias voltage $V_M$ (e.g., a second voltage, in the claims).

The second off-bias voltage $V_M$ reached due to the primary kickback and secondary kickback phenomena, which are above-described, may be a voltage value that is greater than the first off-bias voltage V1. Comparing FIGS. 3 and 6, the second off-bias voltage $V_M$ applied between the gate electrode and the source electrode of the first transistor T1 during the first bias period (t14 to t15) in the one or more embodiments corresponding to FIG. 6 is greater than the first off-bias voltage V1 applied between the gate electrodes and the source electrodes of the first transistors T1 during the first bias period (t3 to t4) in the one or more embodiments corresponding to FIG. 3. Accordingly, according to the one or more embodiments corresponding to FIGS. 6 and 7, it is possible to effectively reduce the charge trap phenomenon during the first bias period (t14 to t15), which is limited.

An operation of the pixel during a period (t15 to t23) after the first bias period (t14 to t15) in FIG. 7 is similar to the operation of the pixel during the period (t4 to t10) after the first bias period (t3 to t4) in FIG. 3.

In a period (t15 to t16, e.g., a sixth period, in the claims), the third scan signal GI[i] is applied to the third scan line SLc[i] in the i-th row to turn on the fourth transistor T4. That is, the period (t15 to t16) may be referred to as an initialization period.

In the initialization period (t15 to t16), as an initialization voltage is applied to the gate electrode of the first transistor T1, the voltage Vgs between the gate electrode and the source electrode of the first transistor T1 may have an on-bias voltage V0. Here, the on-bias voltage V0 may be a voltage at which the first transistor T1 may be turned on. For example, the on-bias voltage V0 may have a negative voltage. The on-bias voltage V0 may be lower than the threshold voltage Vth. Accordingly, the first transistor T1 may be in an on-bias state.

According to one or more embodiments, in case that the on-bias voltage V0 is continuously applied to the voltage Vgs between the gate electrode and the source electrode of the first transistor T1, a hole (e.g., a positive electric charge) may be trapped in the gate-insulating film under the gate electrode. An afterimage, such as image dragging may be visually recognized due to a change in the bias state of the first transistor T1 due to hole trapping, a shift in the threshold voltage Vth according to a change in hysteresis characteristics, or the like. To improve this afterimage, by alternately applying the on-bias voltage V0 and the second off-bias voltage $V_M$ as the voltage Vgs between the gate electrode and the source electrode of the first transistor T1, the occurrence of hole trapping can be reduced.

After the initialization period (t15 to t16), in a period (t16 to t18), the second scan signal GC[i−1] in the (i−1)-th row may be applied to the second scan line SLb[i−1] in the (i−1)-th row. Accordingly, in the period (t16 to t18), the third transistor T3 may be turned on.

In this case, a difference voltage reduced by the threshold voltage Vth of the first transistor T1 from the voltage of the first driving power node ELVDDN, that is, the first power voltage ELVDD, may be applied to the gate electrode of the first transistor T1. During the period (t16 to t18), the threshold voltage Vth of the first transistor T1 may be compensated. In the period (t16 to t18), as the compensation voltage is applied to the gate electrode of the first transistor T1, the voltage Vgs between the gate electrode and the source electrode of the first transistor T1 may have the threshold voltage Vth.

In a period (t17 to t19), the second scan signal GC[i] in the i-th row may be applied to the second scan line SLb[i] in the i-th row. Accordingly, in the period (t17 to t19), the fifth transistor T5 may be turned on.

In a period (t19 to t20), the application of the second scan signal GC[i] may be stopped. The period (t19 to t20) may be referred to as a second bias period. In the second bias period (t19 to t20), the second scan signal GC[i] may be applied to the gate electrode of fifth transistor T5 with a logic high level voltage. The third and fifth transistors T3 and T5 may be turned off at time points t18 and t19, respectively.

At a start time point t19 of the second bias period (t19 to t20), the second scan signal GC[i] may transition from a logic low level to a logic high level. A kickback phenomenon in which the voltage of the first node N1 rises may occur at the rising edge of the second scan signal GC[i]. Due to a voltage rise of the first node N1, in the second bias period (t19 to t20), the voltage Vgs between the gate electrode and the source electrode of the first transistor T1 may have the first off-bias voltage V1. Accordingly, the first transistor T1 may be in an off-bias state.

In the period (t20 to t21), the first scan signal GW[i] may be applied to the first scan line SLa[i] in the i-th row. In the period (t20-t21), the first scan signal GW[i] may be applied to the gate electrode of the second transistor T2 with a logic low level voltage. The second transistor T2 may be turned on in response to the first scan signal GW[i]. The turned-on second transistor T2 may transfer a data voltage Vdata corresponding to the data signal to one electrode (e.g., a source electrode) of the fifth transistor T5. Accordingly, the voltage of the third node N3 may be the data voltage. Accordingly, the voltage Vgs between the gate electrode and the source electrode of the first transistor T1 may be a different voltage depending on the data voltage. Thus, in FIG. 7, the voltage Vgs between the gate electrode and the source electrode of the first transistor T1 is indicated by several lines after a time point t20.

The voltage of the first driving power node ELVDDN and the data voltage may be applied to both ends of the first capacitor Cst. The first capacitor Cst may store a difference voltage between the voltage of the first driving power node ELVDDN and the data voltage.

The difference voltage between the compensation voltage and the data voltage of the first transistor T1 may be stored in the second capacitor Chold.

In a period (t21 to t22), the fourth scan signal GB[i] may be applied to the fourth scan line SLd[i] in the i-th row. Accordingly, the seventh transistor T7 may be turned on. The seventh transistor T7 which is turned-on may transfer the voltage of the initialization power node VINTN to the anode electrode of the light-emitting element LD (or the fourth node N4). In this case, a threshold voltage of the light-emitting element LD can be compensated.

A display device according to one or more embodiments is applicable to various types of electronic devices. In one or more embodiments, an electronic device includes the above-described display device and may further include other modules or devices having additional functions in addition to the display device.

Figure 8:
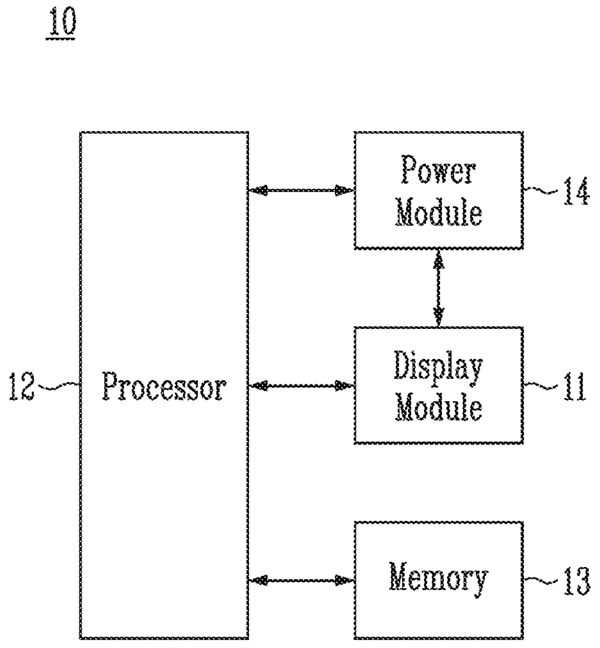
FIG. 8 is a block diagram of an electronic device according to one or more embodiments.

FIG. 8 is a block diagram of an electronic device according to one or more embodiments. Referring to FIG. 8, the electronic device 10 according to one or more embodiments may include a display module 11, a processor 12, a memory 13, and a power module 14.

The processor 12 may include at least one of a central processing unit (CPU), an application processor (AP), a graphics processing unit (GPU), a communication processor (CP), an image signal processor (ISP), or a controller.

The memory 13 may store data and/or information used to operate the processor 12 or the display module 11. When the processor 12 executes an application stored in the memory 13, image data signals and/or input control signals may be transmitted to the display module 11, and the display module 11 may process the provided signal and output image information on a display screen.

The power module 14 may include a power supply module, such as a power adapter or a battery device, and a power conversion module, and the power conversion module converts power supplied by the power supply module and generates power to operate the electronic device 10.

At least one of the above-described components of the electronic device 10 may be included in the display device according to embodiments as described above. In addition, in terms of functionality, some of the individual modules included in one module may be included in the display device, and others may be provided separately from the display device. For example, the display module 11 is included in the display device, whereas the processor 12, the memory 13, and the power module 14 are not included in the display device and are instead provided separately in the electronic device 10.

Figure 9:
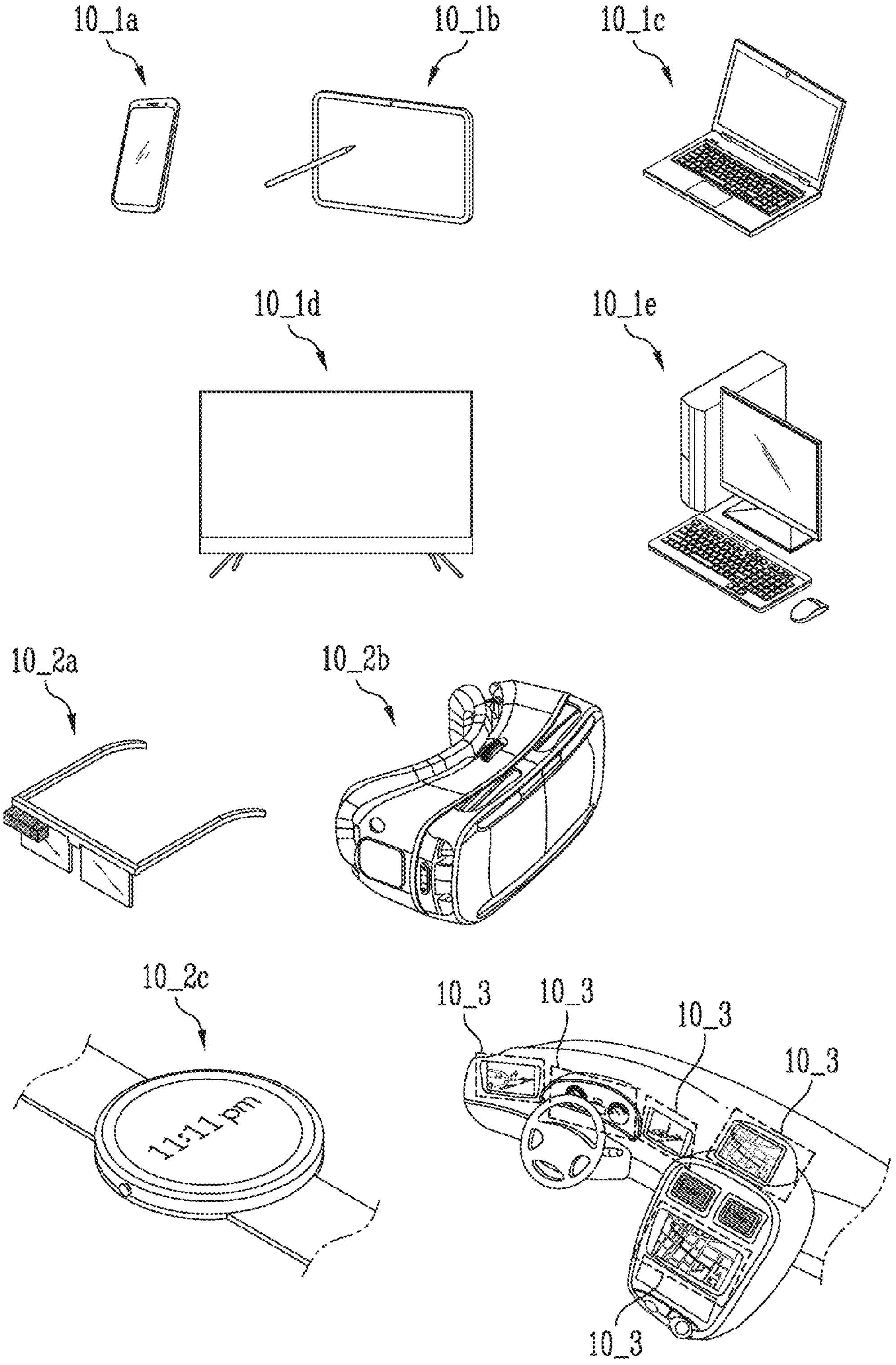
FIG. 9 shows schematic views of various embodiments of an electronic device.

FIG. 9 shows schematic views of various embodiments of an electronic device.

Referring to FIG. 9, various types of electronic devices to which embodiments of a display device are applied may include an electronic device to display images, such as a smartphone 10_1*a*, a tablet PC 10_1*b*, a laptop computer 10_1*c*, a television (TV) 10_1*d*, and a desktop monitor 10_1*e*, a wearable electronic device including a display module, such as smart glasses 10_2*a*, a head-mounted display (HMD) 10_2*b*, and a smart watch 10_2*c*, and an automotive electronic device 10_3 including a display module, such as a center information display (CID) disposed at the instrument cluster, the center fascia, and the dashboard of a vehicle, and a room mirror display.

Although described above with reference to embodiments of the present disclosure, it will be understood that those skilled in the art may variously modify and change the present disclosure without departing from the spirit and scope of the present disclosure described in the claims, with functional equivalents thereof to be included therein.

What is claimed is:

1. A pixel comprising:

a first transistor connected between a first driving power node for receiving a first power voltage and a second node, and having a gate electrode connected to a first node;

a second transistor connected between a data line and a third node, and having a gate electrode electrically connected to a first scan line;

a third transistor connected between the first node and the second node, and having a gate electrode electrically connected to a fifth scan line;

a fourth transistor connected between an initialization power node for receiving an initialization power and the first node, and having a gate electrode electrically connected to a third scan line;

a fifth transistor connected between a reference power node for receiving a reference power and the third node, and having a gate electrode electrically connected to a second scan line;

a sixth transistor connected between the second node and a fourth node, and having a gate electrode electrically connected to a light emission control line; and a light-emitting element connected to the fourth node, wherein the fifth scan line is configured to receive at least one fifth scan signal in a non-emission period in which the sixth transistor is turned off, and wherein the second scan line is configured to receive at least one second scan signal after the at least one fifth scan signal is applied.

2. The pixel of claim 1, wherein the third transistor comprises a P-type transistor, and wherein a voltage of the first node is configured to rise to a first voltage due to a first kickback phenomenon at a rising edge of the fifth scan signal.

3. The pixel of claim 2, wherein the fifth transistor comprises a P-type transistor, and wherein a voltage of the first node is configured to rise from the first voltage to a second voltage due to a second kickback phenomenon at a rising edge of the second scan signal.

4. The pixel of claim 3, wherein the second voltage is configured to be applied to the first transistor during a bias period after the at least one second scan signal is applied to the second scan line.

5. The pixel of claim 4, wherein the bias period is equal to or greater than one horizontal period.

6. The pixel of claim 4, further comprising:

a seventh transistor connected between the initialization power node and the fourth node, and having a gate electrode electrically connected to a fourth scan line;

a second capacitor connected between the first node and the third node; and a first capacitor connected between the first driving power node and the third node.

7. The pixel of claim 6, wherein, in the non-emission period, the fifth scan signal is configured to be applied during a first period, the second scan signal is configured to be applied in a second period after the first period, and a first scan signal is configured to be applied to the first scan line in a third period after the second period, and wherein the bias period is between the second period and the third period.

8. The pixel of claim 7, wherein, in the non-emission period, the second scan signal and the fifth scan signal are respectively applied in a fourth period and in a fifth period between the bias period and the third period.

9. The pixel of claim 7, wherein, during the first period, the third transistor is configured to be turned on, and a voltage obtained by subtracting a threshold voltage of the first transistor from the first power voltage is configured to be applied to a gate electrode of the first transistor.

10. The pixel of claim 9, wherein, during a sixth period after the second period, the fourth transistor is configured to be turned on, and a voltage of the initialization power is configured to be applied to the gate electrode of the first transistor.

11. A display device comprising:

pixels connected to scan lines, a light emission control line, and a data line; and a scan driver for driving the scan lines, wherein one of the pixels in an i-th row (i being a natural number of 2 or more) comprises:

a first transistor connected between a first driving power node for receiving a first power voltage and a second node, and having a gate electrode connected to a first node;

a second transistor connected between the data line and a third node, and having a gate electrode electrically connected to a first scan line in an i-th row;

a third transistor connected between the first node and the second node, and having a gate electrode electrically connected to a second scan line in an (i−1)-th row;

a fourth transistor connected between an initialization power node for receiving an initialization power and the first node, and having a gate electrode electrically connected to a third scan line in the i-th row;

a fifth transistor connected between a reference power node for receiving a reference power and the third node, and having a gate electrode electrically connected to a second scan line in the i-th row;

a sixth transistor connected between the second node and a fourth node, and having a gate electrode electrically connected to the light emission control line; and a light-emitting element connected to the fourth node, wherein, in a non-emission period in which the sixth transistor is turned off, a second scan signal for the (i−1)-th row is configured to be applied to a gate electrode of the third transistor through the second scan line of the (i−1)-th row, and wherein a second scan signal for the i-th row is configured to be applied to a gate electrode of the fifth transistor through the second scan line in the i-th row after the second scan signal for the (i−1)-th row is applied.

12. The display device of claim 11, wherein the third transistor and the fifth transistor comprise P-type transistors, wherein a voltage of the first node is configured to rise to a first voltage due to a first kickback phenomenon at a rising edge of the second scan signal for the (i−1)-th row, and wherein a voltage of the first node is configured to rise from the first voltage to a second voltage due to a second kickback phenomenon at a rising edge of the second scan signal for the i-th row.

13. The display device of claim 12, wherein the second voltage is configured to be applied to the first transistor for a bias period after the second scan signal is applied to the second scan line in the i-th row.

14. The display device of claim 13, wherein the bias period is equal to or greater than one horizontal period.

15. The display device of claim 13, further comprising:

a seventh transistor connected between the initialization power node and the fourth node, and having a gate electrode electrically connected to a fourth scan line;

a second capacitor connected between the first node and the third node; and a first capacitor connected between the first driving power node and the third node.

16. The display device of claim 13, wherein, in the non-emission period, the second scan signal for the (i−1)-th row is configured to be applied during a first period, the second scan signal for the i-th row is configured to be applied during a second period after the first period, and a first scan signal is configured to be applied to the first scan line during a third period after the second period, and wherein the bias period is a period between the second period and the third period.

17. The display device of claim 16, wherein, in the non-emission period, the second scan signal for the i-th row and the second scan signal for the (i−1)-th row are respectively applied in a fourth period and a fifth period between the bias period and the third period.

18. The display device of claim 16, wherein, during the first period, the third transistor is configured to be turned on, and a voltage obtained by subtracting a threshold voltage of the first transistor from the first power voltage is configured to be applied to a gate electrode of the first transistor.

19. The display device of claim 18, wherein, during a sixth period after the second period, the fourth transistor is configured to be turned on, and a voltage of the initialization power is configured to be applied to a gate electrode of the first transistor.

20. An electronic device comprising:

a display device comprising pixels; and a processor configured to control the display device, wherein one of the pixels in an i-th row (i being a natural number of 2 or more) comprises:

a first transistor connected between a first driving power node for receiving a first power voltage and a second node, and having a gate electrode connected to a first node;

a second transistor connected between a data line and a third node, and having a gate electrode electrically connected to a first scan line in an i-th row;

a third transistor connected between the first node and the second node, and having a gate electrode electrically connected to a second scan line in an (i−1)-th row;

a fourth transistor connected between an initialization power node for receiving an initialization power and the first node, and having a gate electrode electrically connected to a third scan line in the i-th row;

a fifth transistor connected between a reference power node for receiving a reference power and the third node, and having a gate electrode electrically connected to a second scan line in the i-th row;

a sixth transistor connected between the second node and a fourth node, and having a gate electrode electrically connected to a light emission control line; and a light-emitting element connected to the fourth node, wherein, in a non-emission period in which the sixth transistor is turned off, a second scan signal for the (i−1)-th row is configured to be applied to a gate electrode of the third transistor through the second scan line in the (i−1)-th row, and wherein, after the second scan signal for the (i−1)-th row is applied, a second scan signal for the i-th row is configured to be applied to a gate electrode of the fifth transistor through the second scan line in the i-th row.

* * * * *